Figure 1:
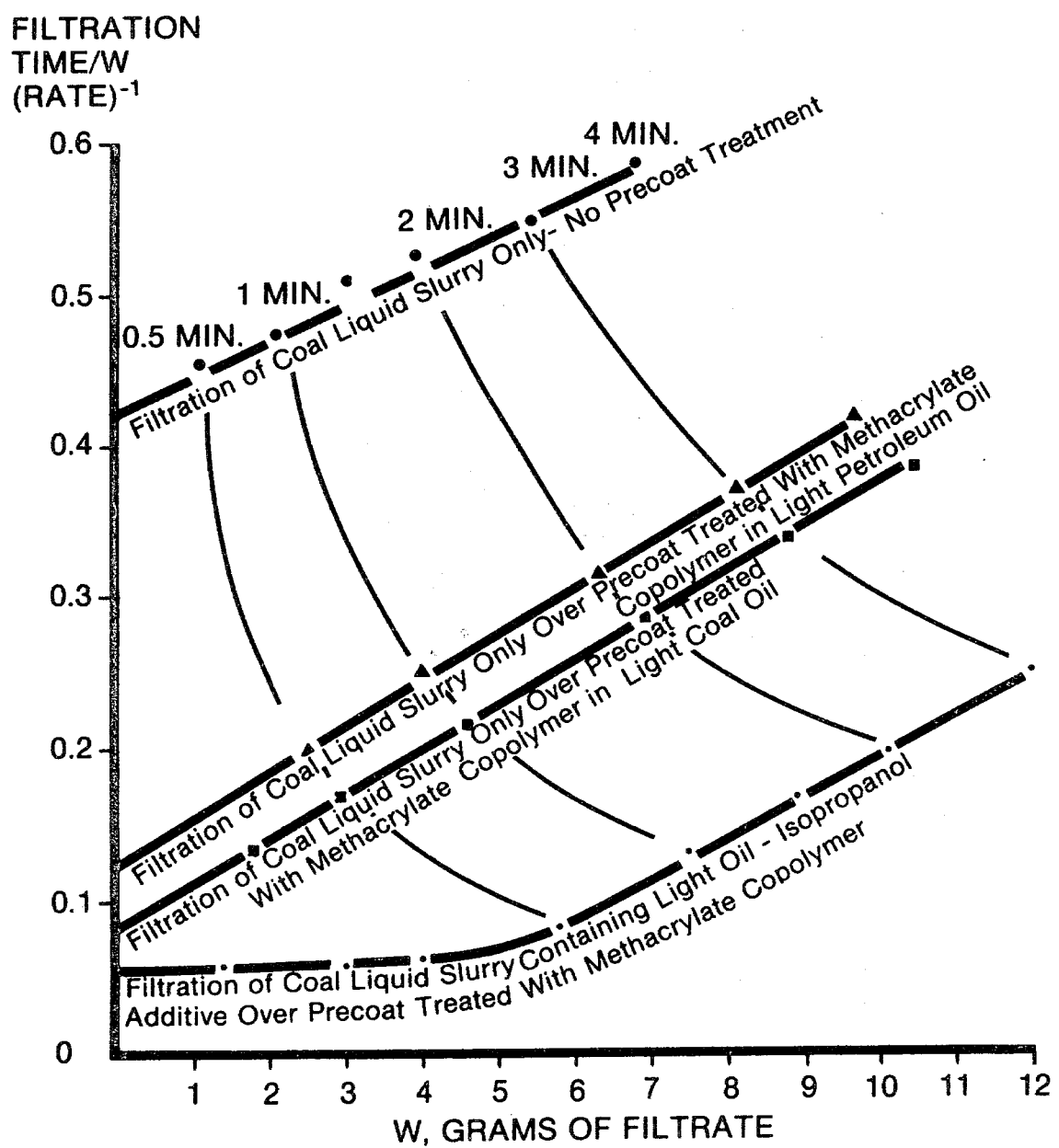

United States Patent [19]

Carr et al.

[11] 4,251,364
[45] Feb. 17, 1981

[54] FILTRATION OF A COAL LIQUID SLURRY USING POLYISOBUTYLENE

[75] Inventors: Norman L. Carr, Allison Park; Edgar L. McGinnis, Gibsonia, both of Pa.

[73] Assignee: Gulf Research & Development Company, Pittsburgh, Pa.

[21] Appl. No.: 36,854

[22] Filed: May 7, 1979

[51] Int. Cl.³ .................... B01D 37/02; C10G 1/04
[52] U.S. Cl. ............................. 210/777; 208/8 LE
[58] Field of Search .................. 44/1 R, 1 A, 1 B, 53, 44/56; 208/8 R, 8 LE, 10; 209/5; 210/43, 51-54, 75, 59

[56] References Cited

U.S. PATENT DOCUMENTS

| | | | |
|---|---|---|---|
| 3,242,073 | 3/1966 | Guebert et al. | 210/75 X |
| 3,492,225 | 1/1970 | Ryzhar | 210/54 |
| 4,029,567 | 6/1977 | Farnard et al. | 208/8 LE |
| 4,030,893 | 6/1977 | Keller | 208/8 LE |
| 4,046,690 | 9/1977 | Rodgers | 210/75 |
| 4,079,004 | 3/1978 | Tan et al. | 208/8 LE |
| 4,094,770 | 6/1978 | Bose | 210/52 X |
| 4,141,691 | 2/1979 | Antonetti et al. | 210/54 X |
| 4,156,649 | 5/1979 | Quinn et al. | 210/51 |

Primary Examiner—Thomas G. Wyse

[57] ABSTRACT

The rate of filtration of a coal liquid slurry is increased by adding polyisobutylene to the slurry prior to filtration or by washing a precoat cake of filter aid with an oil solution of polyisobutylene prior to filtration.

14 Claims, 2 Drawing Figures

FILTRATION OF A COAL LIQUID SLURRY USING POLYISOBUTYLENE

This invention relates to a process for the filtration of a coal liquid slurry.

Several solvation processes are now being developed for producing both liquid and solid demineralized hydrocarbonaceous fuels from coal. One such process is known as the Solvent Refined Coal (SRC) process. The SRC process is a solvation process for producing dissolved liquid and solid hydrocarbonaceous fuels from coal. In this process, crushed raw coal is slurried with a solvent comprising a recycle liquid fraction containing hydroaromatic compounds and is passed together with hydrogen through a preheating zone at an elevated temperature and pressure to dissolve hydrocarbonaceous fuel from coal minerals and to prevent repolymerization of dissolved hydrocarbons by transfer of hydrogen from the hydroaromatic solvent compounds to the dissolved hydrocarbonaceous material. The resulting slurry is then passed to a second and exothermic dissolver zone wherein hydrogenation and hydrocracking reactions occur. Hydroaromatic compounds are formed in the dissolver zone and a fraction containing these compounds is recovered from the dissolver zone effluent slurry for recyle. The residue of the dissolver effluent slurry contains particles of coal minerals and undissolved coal suspended in normally liquid and normally solid dissolved coal, i.e., dissolved coal which is solid at room temperature. The suspended particles are very small, some being of submicron size with most or nearly all being smaller than 10 or 20 microns in diameter. Because of their small size, these particles are very difficult to filter or otherwise remove from the dissolved coal.

The present inventors have disclosed in U.S. Pat. Nos. 4,102,774 and 4,124,485 the treatment of the effluent slurry from a coal liquefaction process, such as the SRC process, with an alcohol to agglomerate or otherwise affect the suspended or dispersed mineral-containing solids to increase the filtration rate of the slurry.

We have now discovered that certain polymers, including alkylmethacrylate or polyalkylmethacrylate copolymers, such as ethylene-propylene methacrylate copolymer, ethylene vinyl acetate copolymer and polyisobutylene are capable of increasing the filtration rate of coal liquid slurries. The polyisobutylene is specific to the present application, while the alkylmethacrylate copolymer and ethylene vinyl acetate copolymer, respectively, are specific to applications cofiled herewith. These polymeric materials are effective for increasing the filtration rate when they are added directly to the coal liquid slurry and homogeneously dispersed therein at a concentration which increases the subsequent rate of filtration. Advantageously, the polymer is first dissolved in a light oil to reduce its viscosity. Furthermore, we have surprisingly found that these polymers are as or even more effective when they are dispersed or dissolved in a coal or petroleum oil in which they are soluble to reduce their viscosity and passed through a precoat cake of filter aid prior to the filtration of a coal liquid slurry therethrough. The achievement of an improvement in filtration rate by means of precoat treatment is particularly remarkable because we have found that the polymer is not irreversibly adsorbed on the filter aid as a result of the pretreatment. The advantage of the invention thereby can be achieved with an essentially complete recovery of the polymer, or a recovery of most or at least 70, 80 or 90 weight percent thereof. The polymer economy advantage prevails only in the case of the precoat treatment mode of this invention, because the addition of the polymer to the coal slurry itself results in a loss of the polymer in the coal liquid filtrate. However, even this is preferably to loss of the polymer by adhesion to the filter aid, where it could not even contribute to the combustion heating value of the coal filtrate.

The fact that these polymers impart a substantial improvement in the filtration rate simply by the use thereof to wash a filter precoat cake without any significant amount of polymer remaining on the filter cake indicates that these polymers affect the surface of the particles of the precoat material in a physical rather than a chemical manner. Although the polymer itself is relatively viscous, it is dissolved in a light oil to provide a pourable solution capable of flowing over the solid particles of filter aid. Any oil remaining on the filter aid will subsequently dissolve in the coal liquid during the filtration. No setting time is required between the polymer wash and the filtration step, but a time lapse is not harmful. The polymer wash exerts no visible effect upon the precoat cake and probably affects the interface between deposited coal solids and the particles of filter aid during the subsequent filtration step. It may be that the polymer pretreatment prevents or reduces adhesion between the coal solids and the precoat solids. Such an effect is highly distinctive from the apparent suspended solids agglomeration function of the alcohols employed in the aforementioned patents. Because of the apparent physical rather than chemical nature of the effect, any solid commercial filter aid can be employed in the practice of this invention. Examples of typical filter aid materials include diatomaceous earth, cellulose, asbestos, and slagwool.

We have further found that a synergistic effect upon filtration rate is achieved by employing with the polymer of this invention an alcohol of the aforementioned patents U.S. Pat. Nos. 4,102,774 and 4,124,485, which are hereby incorporated by reference. To obtain the synergistic effect, the polymer can be added directly to the coal liquid slurry together with the alcohol or a polymer in oil solution can be used to wash the precoat cake so that only the alcohol is added directly to the coal liquid slurry. The discovery of the synergistic effect is a strong indication that the polymer and the alcohol perform unlike functions in the filtration system.

The polymer of this invention can be added to a coal liquid slurry in any amount which provides an improvement in the filtration rate of the slurry. In general, an effective amount of polymer in the coal liquid slurry will be between 0.01 or 0.05 and 2 weight percent. More particularly, the amount will be between 0.1 or 0.25 and 1 or 1.5 weight percent. The polymer or this invention or an oil solution thereof can be added to a coal liquid slurry even if an oil solution of the polymer is also used to wash a precoat cake of filter aid.

The polymer can be added to the coal liquid slurry directly or added as a solution in an essentially solids-free coal or petroleum oil. When the polymer is used to pretreat the filter cake, its viscosity must be reduced and therefore it is passed through the precoat cake in solution with a hydrocarbon oil. Solutions of polymer in a coal or petroleum hydrocarbon oil will generally contain between about 0.1 and 7 weight percent of polymer and more particularly will contain between about 0.5 and 2.5 weight percent of polymer.

Primary, secondary or tertiary aliphatic alcohols containing 2 to 10 carbon atoms can be employed to obtain the aforementioned synergistic effect. Although longer aliphatic chains may be effective, they are more expensive and needlessly increase the cost of the operation. Particularly effective alcohols include isopropyl and normal, secondary and tertiary butanol. One or more alcohols can be employed. The alcohol can be present in the coal liquid in an amount between 0.05 and 15 weight percent. Alcohol concentration ranges between 0.1 and 15 weight percent or between 0.5 or 1.0 and 6 weight percent are effective.

The alcohol employed does not perform any significant hydrogen donor or coal solvation function. For example, while butanol is a preferred alcohol for purposes of filtration it is not an effective alcohol for purposes of coal solvation. In the present process, the alcohol is added to the coal liquefaction process after completion of the coal dissolving step, i.e., after at least about 85 or 90 weight percent of the coal has been dissolved. There is no need to add alcohol to the process until after the coal dissolving and hydrogenation steps are completed. Furthermore, the alcohol in this process does not impart any significant increase in the hydrogen to carbon ratio of the coal liquid. Thereby, most of the alcohol is not consumed in the present process, nor is there significant conversion to another material, such as a ketone, by hydrogen transfer. To prevent the alcohol from functioning as a hydrogen donor, the coal liquid to which the alcohol is added comprises a significant amount of previously added and different hydrogen donor materials, such as at least 2, 3 or 5 weight percent of hydroaromatic materials, such as tetralin and homologues thereof. The hydroaromatic material conserves the alcohol so that most of it can be recycled without hydrotreatment. Since the purpose of the alcohol is specific to solids removal, no prior removal of solids from the coal is required and the alcohol can be added to a coal liquid slurry containing generally at least 3 to 4 weight percent of minerals. The alcohol does not require a base in order to perform its function, such as would enhance its effect if it were to perform a hydrogen donor function. Also, the alcohol functions in the present invention in the liquid phase and therefore can be used for solids-liquid separation at a temperature below its critical temperature.

The temperature of the coal liquid should be at an elevated level prior to alcohol addition and should be between about 100° and 700° F. (38° and 371° C.), generally, between about 150° and 600° F. (66° and 316° C.), preferably; and between about 400° and 500° F. (204° and 288° C.), most preferably. Following the addition of alcohol the coal mixture should be mixed to form a homogeneous composition within the liquid phase. After the addition of the alcohol and before the solids removal step, the coal solution can be allowed to stand at the mixing temperature from 30 seconds to 3 hours, generally, from 1 minute to 1 hour, preferably, or from 2 or 5 minutes to 30 minutes.

An additional beneficial effect can be achieved when the alcohol additive is in blend with a light oil. The light oil can be a substantially solids-free light coal liquid fraction from which the solids have been removed by filtering or other means, such as a process light oil fraction whose boiling range includes the boiling temperature of the alcohol. The blend can be recovered from the process as a single fraction, or the light oil and alcohol can be removed separately from the process and then blended in any desired ratio. An alcohol-oil blend imparts a more beneficial effect upon filtration of solids from a coal liquid than an alcohol itself. While the advantage incident to the addition of the alcohol by itself declines as the quantity of alcohol added increases beyond a critical value, enhanced quantities of alcohol can be employed with advantage by utilizing a blend of alcohol and light oil. Since the alcohol is recycled, there is very little additional operating cost incident to the use of an enhanced quantity of alcohol. Phenol, which is present in coal liquids, has a detrimental effect upon solids separation, apparently acting as a dispersion medium. In order to avoid recycle of phenol, the light oil fraction should boil below the boiling point of phenol, which is 358° F. (181° C.). For example, a coal liquid fraction boiling no higher than about 355° F. (169° C.) can be employed. The boiling range of the coal liquid fraction need not overlap the boiling range of recycle process solvent. This upper temperature limitation does not apply if the light oil is not a coal liquid, and therefore does not contain phenols. For example, if the light oil is a petroleum fraction, a light, medium or heavy naphtha boiling no higher than 500° F. (260° C.) can be employed. The amount of alcohol present in the light oil fraction can be between about 1 and 75 weight percent, generally, or between about 10 and 25 weight percent preferably. The amount of solids-free light oil-alcohol blend added to the solids-containing coal liquid can be between about 1 and 50 weight percent, generally, between about 1 and 15 weight percent, preferably, and between about 2 and 5 weight percent, most preferably.

In one mode, alcohol can be added to a hot, unfiltered slurry of dissolved coal and the mixture is stirred and allowed to age. It is then passed through a filter containing a diatomaceous earth precoat which had previously been washed with a solution of polymer in light oil. The alcohol-containing filtrate, which is essentially free of polymer, is then fractioned to recover a low boiling fraction containing at least a portion of the alcohol. This fraction is then recycled and mixed with filter feed slurry, together with any make-up alcohol that may be required. This mode of operation provides the synergistic effect of the polymer and alcohol upon the filtration rate, while allowing maximum economy in consumption of polymer and alcohol.

In performing the filtration tests to illustrate the present invention, the data obtained were interpreted according to the following well known filtration mathematical model:

$$(T/W) = kW + C$$

where:
T = filtration time, minutes
W = weight of filtrate collected in time T, grams
k = filter cake resistance parameter, minutes/grams$^2$
C = precoat resistance parameter, minutes/gram and
$(T/W) = (\text{rate})^{-1}$ In the filtration tests reported below, the amount of filtrate recovered, W, was automatically recorded as a function of time, T. W and T represent the basic data obtained in the tests. The following variables were held constant at desired levels wherever necessary to obtain comparative measurements: temperature, pressure drop across the filter, precoat nature and method of application, precoat thickness, and the cross-sectional area of the filter.

Figure 2:
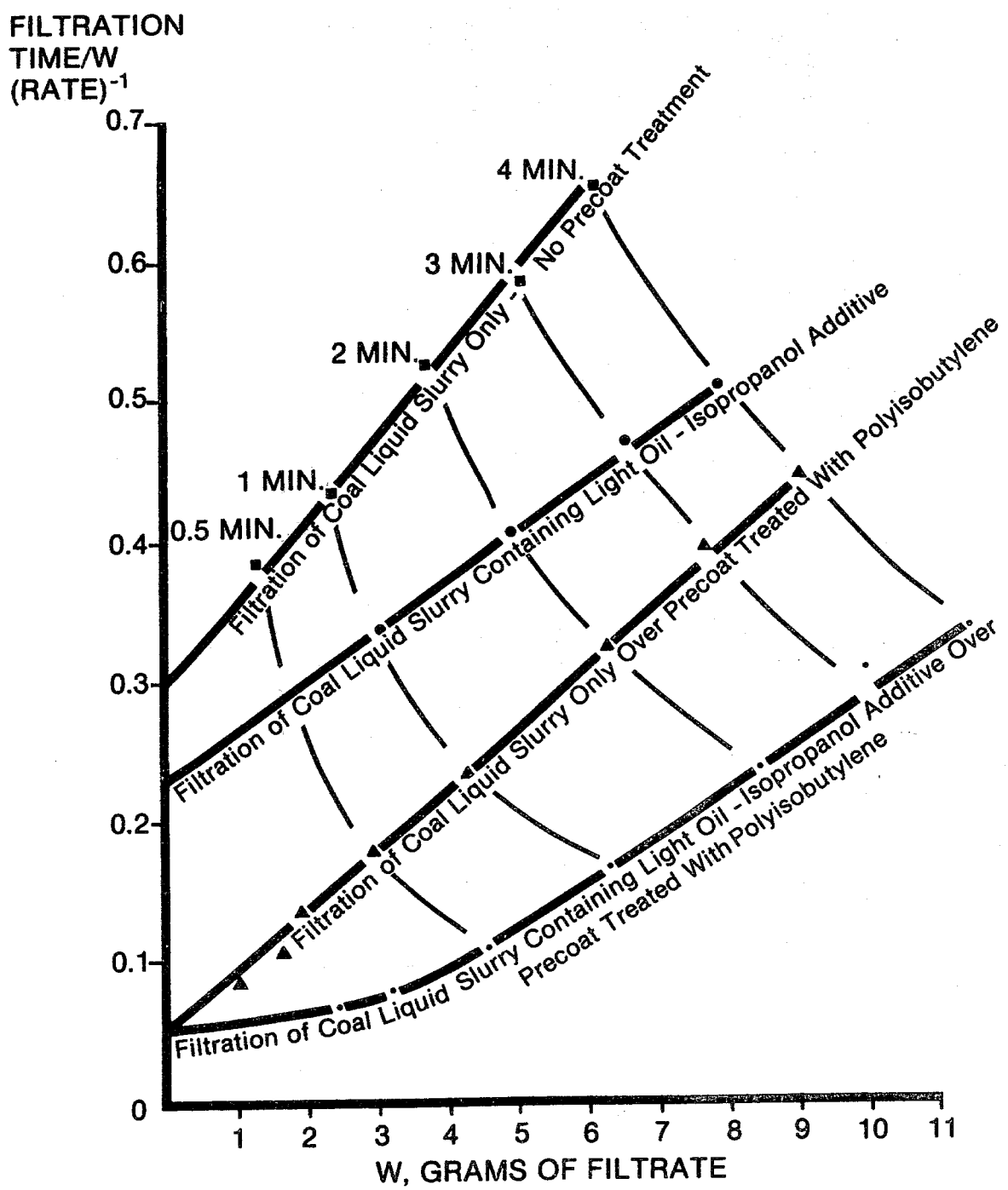

The W versus T data obtained were manipulated according to the above mathematical model, as illustrated in FIGS. 1 and 2. FIGS. 1 and 2 each show four curves, with each curve representing a separate series of filtration tests. The vertical axis of each figure shows the value for T/W, which is the reciprocal of the filtration rate. The slope of each curve is k, and the intercept of each curve with the vertical axis is C.

In analyzing each curve, the parameter C is primarily a characteristic of the precoat because it is the reciprocal of the filtering rate at the beginning of the test before any significant amount of filter cake is deposited on top of the precoat. On the other hand, the slope k is a parameter of the filter cake which is being deposited upon the precoat during the filtration, and is therefore representative of the filtration itself exclusive of the precoat. A relatively low slope (low value for k) represents an advantageously low cake resistance to filtration. Stated in another manner, any reduction in k represents an increase in the prevailing rate of filtration. FIGS. 1 and 2 show that the lines representing the base test and the test employing precoat treatment only have the greatest slope (highest k) while the lines representing the tests utilizing an alcohol additive have the lowest slope (lowest k). Viewed in another manner, although each curve indicates a lower filtration rate (i.e., higher (rate)$^{-1}$) at the end as compared to the start of a test, a low curve slope indicates that the filtering rate has not diminished greatly during the test. FIGS. 1 and 2 show that although the lines representing the tests employing the precoat treatment only have about the same slope as the line representing the corresponding base test, the reduced precoat resistance parameter C in the case of the tests employing polymer treatment only resulted in a greater amount of filtrate after one minute as compared to the corresponding base test. It is therefore apparent that the synergistic effect due to the employing of both precoat treatment and alcohol addition is due to the differentiated combined effects of reducing both the filter cake resistance parameter k and the precoat resistance parameter C.

It is noted that each filtering test was performed without solvent washing of the filter cake. Since a solvent wash is intended to alter the nature of the filter cake, it would also alter the k value. Many industrial filters are of the continuous rotary type wherein filtration cycles of no more than about 1 minute duration are continuously alternated with washing cycles wherein a wash solvent is sprayed through the filter cake to wash off the absorbed coal liquid. Therefore, unless otherwise indicated, all the tabulated filtering rates in the tests reported in the following examples represent the filtering operation during the first minute of filtration.

In performing the filtration tests of the following examples, a 90 mesh screen located within the filter element was precoated to a depth of 0.5 inch (1.27 cm) with diatomaceous earth. The filter element measured 1.9 cm I.D. by 3.5 cm height and provided a surface area of 2.84 cm$^2$. The screen was supported by a sturdy grid to prevent deformation. The precoat operation was performed by pressuring a 5 weight percent suspension of the precoat material in process light oil onto the screen using a nitrogen pressure of 40 psi (2.8 kg/cm$^2$). The precoat operation was performed at a temperature close to that of the subsequent filtering operation. The resulting porous bed of precoat material weighed about 1.2 grams. After the precoat material had been deposited, nitrogen at a pressure of about 5 psi (0.35 kg/cm$^2$) was blown through the filter for about 1-2 seconds to remove traces of light oil. The light oil flowed to a container disposed on an automatic weighing balance. The light oil was weighed to insure deposition of the required quantity of precoat material. Following this operation the light oil was discarded. The balance was linked to a recorder to be used later to provide a continuous (at 5 second intervals) printed record of filtrate collected as a function of time.

A 750 gram sample of unfiltered oil (UFO) without any additive was then introduced into a separate autoclave vessel which acted as a reservoir. The UFO was maintained at a temperature of 100°-130° F. (38°-54° C.) and was continuously stirred. Stirring was accomplished using two 5 cm turbines. The shaft speed was 2,000 rpm. The filtration was begun by applying a selected 40-80 psi (2.8-5.6 kg/cm$^2$) nitrogen pressure to the autoclave. The UFO flowing from the autoclave passed through a preheater coil whose residence time was controlled by the manipulation of valves and which was provided with inlet and outlet termocouples so that the UFO reaching the filter was maintained at a uniform temperature. The UFO leaving the preheater was passed to the filter where a solid cake was formed and a filtrate obtained. The filter element and filter heater were also fitted with thermocouples. As indicated above, filtrate was recovered on a balance and its weight was automatically recorded every 5 seconds. The filtrate was collected in a clean container.

Comparative tests to determine the effect of additives were performed using the same feed lot of UFO for which filtration data had been collected. First, the system tubing and the filter were purged of UFO with nitrogen at a pressure of about 100 psi (7 kg/cm$^2$). The additive substance was pumped into the autoclave reservoir containing UFO. A separate filter element was fitted and precoated in the same manner as described above and the tests employing an additive in the UFO were performed in the same manner as the tests performed on the UFO without an additive. Following each filtration, the residue on the precoat material in the filter was purged with nitrogen and washed with an appropriate liquid to eliminate the UFO and additive combination.

Following is an analysis of a typical unfiltered SRC feed coal liquid slurry employed in the tests. Although light oil had been flashed from the coal liquid slurry in process pressure step-down stages and would be available for preparing polymer and alcohol blends, if required, the filter feed oil had not experienced removal of any of its solids content prior to filtration.

Specific gravity at 60° F. (15.6° C.); 1.15
Kinematic viscosity at 210° F. (98.9° C.); 24.1 centistokes
Density at 60° F. (15.6° C.); 1.092
Ash, 4.49 weight percent
Pyridine insolubles, 6.34 weight percent
Distillation, ASTM D1160

| Percent | Temp. °F. | (°C.) at 1 atm. |
| --- | --- | --- |
| 5 | 518 | (270) |
| 10 | 545 | (285) |
| 20 | 566 | (297) |
| 30 | 602 | (317) |
| 40 | 645 | (341) |
| 50 | 695 | (368) |

-continued

| Percent | Temp. °F. | (°C.) at 1 atm. |
|---|---|---|
| 60 | 768 | (409) |
| 70 | 909 | (487) |
| 71-recovery of all distillables occurs at 925° F. (496° C.) | | |

For tests reported below employing a light oil to prepare a blend of an alcohol or polymer, following are typical specifications for the light oil.
Specific gravity at 60° F. (15.6° C.); 0.830
Density at 60° F. (15.6° C.); 0.829
Kinematic viscosity at 100° F. (37.8° C.); 0.861 centistokes
Distillation, ASTM D-86 at 763 mm Hg

| Percent | Temperature °F. (°C.) |
|---|---|
| 5 | 162 ( 72) |
| 95 | 442 (228) |
| EP | 492 (256) |

EXAMPLE 1

Tests were performed to illustrate the effect upon filtration rate achieved by adding certain polymers to a coal liquid slurry and then filtering the slurry at a temperature of 127° C. with a pressure drop of 5.6 kg/cm$^2$ in a filter having a precoat cake of diatomaceous earth filter aid, similar to the filter in the test system described above. The polymers tested includes ethylene-propylene methacrylate copolymer, ethylene vinyl acetate copolymer and a low and a high viscosity polyisobutylene. Each polymer tested was dissolved in a light oil to form a light oil solution which was miscible with and capable of homogeneous dispersion throughout the coal liquid slurry. The results of these tests are shown in Table 1.

TABLE 1

| Effect of Polymer Additives on Filtration of Coal Slurry | | | | |
|---|---|---|---|---|
| Slurry Additive and Concentration[2] | PPM | k (min/g$^2$) | C (min/g) | Rate[1] (g/min) |
| Base run (polymers absent) | 0 | .0271 | .23 | 3.2 |
| Ethylene-propylene copolymer of methacrylate | 2,400 | .0232 | .16 | 3.8 |
| Ethylene-propylene copolymer of methacrylate | 10,000 | .0139 | .08 | 6.2 |
| Ethylene vinyl acetate copolymer | 2,500 | .0220 | .10 | 4.8 |
| Ethylene vinyl acetate copolymer | 10,000 | .0142 | .13 | 5.0 |
| Polyisobutylene[3] | 2,500 | .0155 | .12 | 5.8 |
| Polyisobutylene[3] | 10,000 | .0172 | .23 | 3.5 |
| Polyisobutylene[4] | 2,500 | .0203 | .26 | 3.1 |
| Polyisobutylene[4] | 10,000 | .0181 | .12 | 5.4 |

[1]For the first minute of filtration.
[2]Base run was made using coal liquid slurry containing 5% light oil. Each polymer was added as a solution in the same amount of light oil.
[3]Viscosity at 100° C. of 2474 centistokes.
[4]Viscosity at 100° C. of 680 centistokes.

Each of the polymer additives illustrated in the tests of Table 1 induced an improvement in the filtration rate of the coal liquid, as compared to the base run. In the case of the ethylene-propylene copolymer of methacrylate, the ethylene vinyl acetate copolymer and the polyisobutylene having a viscosity of 680 centistokes at 100° C., the filtration rate improved with an increase in the amount of polymer present. However, in the case of the isobutylene having a viscosity of 2474 centistokes at 100° C., the smaller amount of polymer imparted the greater improvement in filtration rate. Based upon these data, a preferred isobutylene polymer has a molecular weight such that the polymer exhibits a viscosity at 210° F. (99° C.) of between about 604 and 690 centistokes.

EXAMPLE 2

Tests were performed to determine whether the polymers which improved filtration rate are retained by either the filter cake deposited during filtration of a polymer-free coal liquid slurry or by a precoat cake of commercial diatomaceous earth precoat material when washed with a solids-free light oil solution of a polymer prior to any contact of a coal liquid slurry therewith. In these tests, an individual sample comprising a polymer dissolved in a light oil was passed through a polymer-free cake of coal minerals and also through a polymer-free cake of diatomaceous earth. The results of these tests are shown in Table 2.

TABLE 2

| | Polymer Concentration in Light Oil, Weight Percent | | |
|---|---|---|---|
| | Initial | Following Contact With Cake of Coal Minerals | Following Contact With Precoat Cake |
| Polyisobutylene in light oil | 0.70 | 0.70 | 0.64 |
| Ethylene-propylene copolymer of methacrylate in light oil | 0.70 | 0.68 | 0.70 |

Table 2 shows that within expected limits of experimental error no significant quantity of either polyisobutylene or of ethylene-propylene copolymer of methacrylate was retained by either a polymer-free filter cake of coal minerals or by a polymer-free precoat cake of diatomaceous earth when either is washed with an oil solution of the polymer. Therefore, the advantage in filtration rate demonstrated in Example 3, below, obtained by washing a filter precoat cake of diatomaceous earth with an oil solution of polymer is obtained by wetting the cake with the polymer without any significant retention of the polymer on the cake. Apparently, such wetting produces an effect at the interface between the precoat solids and the coal solids when these two materials contact each other during the subsequent filtration step. One theory is that polymer pretreatment of the precoat prevents the coal solids from adhering to the precoat solids. Such an effect is in sharp contrast to particle agglomeration, which is the probable mechanism when an additive such as an alcohol improves filtration rate.

The tests of Table 2 indicate that the advantage of the invention can be achieved with an essentially complete recovery of polymer. This advantage prevails only in the case of the precoat wash mode of this invention, because the addition of the polymer to the coal slurry results in a loss of the polymer in the coal liquid filtrate.

EXAMPLE 3

Tests were performed to illustrate the effect upon filtration rate obtained by washing a precoat cake of diatomaceous earth filter aid with either a light oil solution of ethylene vinyl acetate copolymer or a light oil solution of polyisobutylene. The polyisobutylene used had a viscosity lower than that of the low viscosity polyisobutylene of the tests of Table 1. The filtration tests employing a light oil solution of ethylene vinyl acetate copolymer were performed at a temperature of 232° C. with a filter pressure drop of 5.6 kg/cm². The filtration tests performed employing a light oil solution of the low viscosity polyisobutylene were performed at a temperature of 188° C. with a pressure drop of 5.6 kg/cm². The precoat material, in the base test or after washing with 25 grams of the indicated light oil solution of polymer, was subsequently used for the filtration of a coal liquid slurry. In some tests the coal liquid slurry contained no additive and in other tests the coal liquid slurry contained an additive comprising a blend of isopropanol in light oil in the indicated amount based on coal liquid slurry. The light oil used in preparing the isopropanol blend was a light petroleum oil. The light oil used in preparing the polymer solutions was either a light petroleum oil or a light coal liquid fraction. The results of these tests are shown in Table 3.

This is particularly remarkable because the method of precoat wash was shown above to permit recovery of all or essentially all of the polymer used for the pretreatment, whereas polymer added to the coal slurry is not recoverable but is ultimately consumed as fuel together with the coal liquid.

The data of Table 3 show that precoat prewashing with a light oil solution of polyisobutylene increased the filtration rate 95 percent. The data of Table 3 further show that in the absence of precoat prewashing with a polymer or of addition of polymer to the coal liquid slurry, the addition of the isopropanol solution to the coal liquid induced a 36 percent increase in filtration rate, using a sample of the same coal liquid that was employed in the polyisobutylene test. A summation of the 95 percent rate improvement due to polyisobutylene wash of the precoat and of the 36 percent rate improvement due to independent addition of isopropanol solution to the coal liquid slurry would indicate a combined effect constituting a 131 percent rate increase. However, when addition of the isopropanol solution to the coal liquid slurry was combined with prewash of the precoat with the polyisobutylene polymer, a filtration rate increase of 186 percent was achieved, indicating a substantial synergistic effect.

The data of Table 3 show that prewashing of the precoat cake of diatomaceous earth with a light oil solution of ethylene vinyl acetate copolymer without direct addition of copolymer to the coal liquid increased the filtration rate 119 percent, compared to the base test. This increase is of a similar order of magnitude compared to the similar test employing polyisobutylene. However, when addition of the isopropanol solution to the coal liquid is combined with precoat washing using an oil solution of ethylene vinyl acetate copolymer, an increase of 257 percent was observed due to the com-

TABLE 3

Effect of Polymer Treatment of Precoat Upon Filtration Rate

| Coal liquid slurry and additive, if any | Precoat Cake Wash | k (min/g²) | C (min/g) | Filtration rate after first minute (g/min) | Improvement over base test, percent |
|---|---|---|---|---|---|
| Coal liquid slurry only | None | .0247 | .42 | 2.1 | — |
| Coal liquid slurry only | 2% ethylene vinyl acetate copolymer in light coal oil | .0293 | .08 | 4.6 | 119 |
| Coal liquid slurry containing 5 percent light oil and 2% isopropanol | 2% ethylene vinyl acetate copolymer in light coal oil | .0162 | .05 | 7.5 | 257 |
| Coal liquid slurry only | None | .0558 | .30 | 2.2 | — |
| Coal liquid slurry only | 7% low viscosity polyisobutylene in light oil | .0438 | .05 | 4.3 | 95 |
| Coal liquid slurry containing 5 percent light oil and 2% isopropanol | None | .0359 | .23 | 3.0 | 36 |
| Coal liquid slurry containing 5 percent light oil and 2% isopropanol | 7% low viscosity polyisobutylene in light oil | .0252 | .05 | 6.3 | 186 |

A comparison of the data of Table 3 with the data of Table 1 shows that the improvement in filtration rate achieved by the method of polymer precoat wash is even greater than the improvement in filtration rate achieved by the addition of polymer to the coal slurry.

bined effects, which increase is even greater than the increase in the similar test employing polyisobutylene. Therefore, a considerable synergistic effect is also achieved when a light oil solution of an ethylene vinyl acetate copolymer is used for precoat washing, when the precoat washing is coupled with the use of an isopropanol additive in the coal slurry.

EXAMPLE 4

Tests were performed to determine the effect of the concentration in the light oil of the polymer used to prewash the precoat material. In these tests, several different concentrations of polyisobutylene in light oil were tested for washing a precoat cake of diatomaceous earth prior to a coal liquid slurry filtration operation performed at a temperature of 204° C. and a pressure drop of 6.3 kg/cm². The filter cake resistance parameter and the filtration rate for the first minute of filtration are reported in Table 4. In the tests, the indicated solution concentration of polyisobutylene was used to wet the precoat material prior to the filtration of a coal slurry which itself contained no filtration improver additives.

TABLE 4

Effect of Washing Precoat with Light Oil Solutions of Polyisobutylene

| Polyisobutylene Concentration in Light Oil-Wt. % | C (min/g) | Filtration Rate (g/min) |
|---|---|---|
| 0 | .33 | 2.5 |
| 2 | .14 | 4.4 |
| 3.5 | .10 | 5.0 |
| 7 | .07 | 5.4 |

Table 4 shows that progressive increases in the concentration of the polymer in the light oil resulted in progressive increases in filtration rate. However, there is a sharp decline in the effect of increases in polymer concentration at levels above about 2 or 3 weight percent. Table 4 shows that the filtration rate is doubled when the polymer concentration used for the precoat wash is 3.5 percent, but doubling this polymer concentration to 7 percent provided only a relatively small additional improvement in filtration rate.

EXAMPLE 5

FIG. 1 graphically illustrates the effect upon filtration rate of precoat prewetting with a light oil solution of an ethylene-propylene copolymer of methacrylate while FIG. 2 graphically illustrates the effect upon filtration rate or precoat prewetting with a light oil solution of polyisobutylene. In each figure the effect upon the subsequent coal liquid filtration rate is shown both with and without an additive to the coal liquid slurry comprising 2 weight percent isopropanol and 5 weight percent light oil, based on the coal liquid slurry. FIGS. 1 and 2 each show a base run with no additive in the coal liquid and with no precoat pretreatment. FIG. 1 shows that separate precoat pretreatment tests were performed with the methacrylate copolymer, one test wherein the copolymer was dissolved in a light petroleum oil boiling in the range 162° to 340° C. and another test wherein the copolymer was dissolved in a light coal oil boiling in the range 361° to 463° C. FIGS. 1 and 2 show the filtration rates prevailing after periods of 0.5, 1, 2, 3 and 4 minutes. The tests of FIG. 1 were performed at a temperature of 230° C. with a pressure drop of 5.6 kg/cm². The tests of FIG. 2 were performed at a temperature of 188° C. with a pressure drop of 6.3 kg/cm².

The first minute of filtration has a particular significance in rotary drum filtration systems wherein an outer skin of the filter cake is scraped off upon each revolution of the drum by means of a knife edge, and the filter generally rotates for less than one minute before newly deposited filter cake reaches the knife edge. In this manner, long-term residue accumulation upon the filter is prevented and a fixed or static filtration system does not develop. By scraping the surface of a rotary filter with a knife edge at intervals of less than 1, 2 or 3 minutes, a relatively fresh filtration system is continuously maintained. A 0.001 inch (0.0024 cm) cut per revolution is generally adequate. FIG. 2 graphically illustrates the data of Table 3 wherein it was indicated that at a 1 minute filtration time the effect of addition of the light oil solution of isopropanol additive to the coal liquid alone provided a 36 percent increase in the filtration rate while the effect of the polymer precoat was alone provided a 95 percent increase in filtration rate. Whereas the arithmetical summation of these individual effects is 131 percent, the empirical combined effect shown in Table 3 is 186 percent, indicating a synergistic effect upon concomitant performance of these two filtration features. These data strongly indicate that each of these effects is functionally different, the effect of the alcohol probably being to agglomerate coal mineral particles in the coal slurry while the polymer probably exerting an interface effect between the deposited coal solids and the particles of filter aid.

FIG. 1 shows that after a one minute filtration time the wash of the precoat with a light oil solution of ethylene-propylene methacrylate copolymer imparted a 90 percent or a 119 percent improvement in the filtration rate, depending upon which light oil solvent is employed for the polymer. However, the combined effect of the precoat prewash and the addition of an isopropanol additive to the coal liquid slurry was a remarkable 257 percent, again indicating synergism and providing strong evidence that different functions are exerted by the isopropanol in the coal liquid slurry and the polymer precoat wetting step.

EXAMPLE 6

Screening tests were performed wherein commercial polymers other than those tested in the previous examples were added to coal liquid slurries to determine their effect upon filtration rate. These filtration screening tests were performed at a temperature of 250° C. with a filter pressure drop of 15 psi (1.05 kg/cm²) in a filtration system employing a diatomaceous earth precoat and similar to the test system employed in the previous examples. The filter rate after a 12 minute test period for each of these additives is presented in Table 5. A lengthy filtration interval was employed because these tests were screening tests made for the purpose of eliminating obviously ineffective additives.

TABLE 5

| Additive | Concentration in Coal Liquid Slurry, Weight Percent | Flow Rate, grams/min. |
|---|---|---|
| None | 0 | 0.88 |
| Acrylate copolymer | 2 | 0.71 |
| Commercial anionic water soluble polymer | 2 | 0.88 |
| Chlorinated low MW polyethylene | 1 | 0.85 |
| Polyvinyl acetate copolymer | 1 | 0.47 |
| Commercial cationic water soluble polymer | 2 | 0.72 |

The data of Table 5 show that certain polymers are not capable of enhancing the filtration rate even though they are derived from monomers only slightly different from monomers used to prepare a filtration rate enhancing polymer. For example, while methacrylate copolymer was shown above to improve the filtration rate of coal liquids, the acrylate copolymer did not. Also, while ethylene vinyl acetate copolymer was shown above to improve the filtration rate of coal liquids, neither the polyvinyl acetate copolymer derived from a monomer other than ethylene nor chlorinated low MW polyethylene were capable of improving the filtration rate of coal liquids. Finally, neither the commercial anionic water soluble polymer nor the commercial cationic water soluble polymer was capable of improving the filtration rate of the coal liquid, which is an essentially water-free slurry. These water soluble polymers are consrasted to the non-water soluble polymers tested above including polyisobutylene, ethylene-propylene copolymer of methacrylate and ethylene vinyl acetate copolymer, each of which is capable of homogeneous dispersement in a coal hydrocarbonaceous liquid either alone or in solution with a solubilizing oil, such as an oil derived from the coal liquid.

EXAMPLE 7

Further screening tests were performed wherein additional commercial polymers were added to coal liquid slurries to determine their effect upon filtration rate. These filtration tests were performed at a temperature of 550° C. with a filter pressure drop of 22 psi (1.54 kg/cm$^2$) in a filtration system employing a diatomaceous earth precoat and similar to the test system of the previous examples. Because these tests were screening tests, the filter rate was measured after a 12 minute test period. For comparative purposes two filtration rate-promoter polymer additives, polyisobutylene and ethylene vinyl acetate copolymer were tested over a similar period. The results of these tests are presented in Table 6.

TABLE 6

| Additive | Concentration in Coal Liquid Slurry, Weight Percent | Flow Rate grams/min. |
| --- | --- | --- |
| None | 0 | 1.88 |
| Commercial cationic water soluble polymer | 1 | 1.11 |
| Resin composed of cyclo and alkyl saturates | 2 | 1.90 |
| Commercial cationic water soluble polymer mixture including polyamid resins | 1 | 1.39 |
| Polyisobutylene | 1 | 2.90 |
| Ethylene vinyl acetate copolymer | 2 | 3.64 |

The data of Table 6 show that neither the commerical water soluble polymers nor the resin composed of cyclo and alkyl saturates exerted a significant filter rate improvement effect in the essentially water-free coal liquid slurry being filtered. In contrast, the non-water soluble polymers, polyisobutylene and ethylene vinyl acetate copolymer, each exerted a substantial filter rate improving effect in these 12 minute additive screening tests.

We claim:

1. A process for filtering a coal liquid slurry produced in a process for dissolving hydrocarbonaceous fuels from coal with a solvent and containing hydrocarbonaceous liquid and suspended coal minerals comprising adding polyisobutylene to said slurry in an amount which increases the rate of filtration thereof, and then filtering said slurry.

2. The process of claim 1 wherein a solution of polyisobutylene in hydrocarbonaceous oil is added to said slurry.

3. The process of claim 1 wherein a solution of about 0.1 to 7 weight percent polyisobutylene in hydrocarbonaceous oil is added to said slurry.

4. The process of claim 1 wherein the viscosity of said polyisobutylene is between about 604 and 690 centistokes at 210° F.

5. The process of claim 1 wherein the amount of polyisobutylene added to said slurry is between about 0.01 and 2 weight percent.

6. The process of claim 1 wherein the amount of polyisobutylene added to said slurry is between about 0.05 and 1.5 weight percent.

7. The process of claim 1 wherein said polyisobutylene is non-water soluble.

8. A process for increasing the rate of filtration of a coal liquid slurry produced in a process for dissolving hydrocarbonaceous fuels from coal with a solvent and containing hydrocarbonaceous liquid and suspended coal minerals comprising depositing a precoat cake of filter aid on a filter element, passing a solution of polyisobutylene in hydrocarbonaceous oil through said precoat cake, and then filtering said slurry through said precoat cake.

9. The process of claim 8 wherein the solution of polyisobutylene in hydrocarbonaceous oil comprises between about 0.1 and 7 weight percent of polyisobutylene.

10. The process of claim 8 wherein the viscosity of said polyisobutylene is between about 604 and 690 centistokes at 210° F.

11. The process of claim 8 wherein said filter aid is diatomaceous earth.

12. The process of claim 8 wherein said polyisobutylene is non-water soluble.

13. The process of claim 8 wherein at least 70 percent of said polyisobutylene passes through said precoat cake.

14. The process of claim 8 wherein essentially all of said polyisobutylene passes through said precoat cake.